(12) United States Patent
Schäfer et al.

(10) Patent No.: US 7,150,590 B2
(45) Date of Patent: Dec. 19, 2006

(54) MACHINING TOOL, ESPECIALLY A MILLING TOOL

(75) Inventors: Hans Schäfer, Gomaringen (DE); Matthias Oettle, Riederich (DE)

(73) Assignee: Hartmetall-Werkzeugfabrik Paul Horn GmbH, Tügingen (DE)

( * ) Notice: Subject to any disclaimer, the term of this patent is extended or adjusted under 35 U.S.C. 154(b) by 0 days.

(21) Appl. No.: 10/515,070

(22) PCT Filed: Mar. 25, 2003

(86) PCT No.: PCT/EP03/03078

§ 371 (c)(1),
(2), (4) Date: Nov. 19, 2004

(87) PCT Pub. No.: WO03/097282

PCT Pub. Date: Nov. 27, 2003

(65) Prior Publication Data

US 2005/0169723 A1    Aug. 4, 2005

(30) Foreign Application Priority Data

May 22, 2002    (DE) ................... 102 22 446

(51) Int. Cl.
    *B23C 7/00*    (2006.01)
(52) U.S. Cl. .................. 409/234; 407/40; 407/48; 408/233; 408/239 R
(58) Field of Classification Search ........... 409/232, 409/234; 407/34, 40, 48, 53; 408/233, 239 R, 408/713
    See application file for complete search history.

(56) References Cited

U.S. PATENT DOCUMENTS 2,493,039 A * 1/1950 Sochia ................. 408/201
5,678,967 A * 10/1997 Savoie ................. 409/233
6,276,879 B1 * 8/2001 Hecht .................. 409/234
6,582,164 B1 * 6/2003 McCormick ............ 408/226
6,705,807 B1 * 3/2004 Rudolph et al. .......... 408/1 R

FOREIGN PATENT DOCUMENTS

DE    34 02 547 A1    8/1985

(Continued)

*Primary Examiner*—Monica Carter
*Assistant Examiner*—Eric A. Gates
(74) *Attorney, Agent, or Firm*—Roylance,Abrams,Berdo & Goodman, L.L.P.

(57) ABSTRACT

A machining tool, especially a milling tool, includes a shaft-like holder defining a longitudinal axis (13). A seat (9) is provided in the front face of the holder for a cutting plate that can be inserted into the holder. The cutting plate has a coupling part for mounting in the seat (9) of the holder. The coupling part has three ribs which project axially from the end surface of the cutting plate that is opposite the holder and which extend radially. The ribs are provided for engagement in complementary grooves (31) configured in the seat (9) of the holder. Their side walls (37 and 35) form driving surfaces and support surfaces, which interact for transmitting a machining torque, or as axial position safety-catch, with corresponding surfaces of the flanks of the ribs of the cutting plate. The driving surfaces and the supporting surfaces are formed by limited partial surfaces (43 and 41) of the side walls (37 and 35) of the grooves (31) whose other surfaces are retracted in relation to the partial surfaces (43 and 41) to form a spacing between the ribs and the walls of the grooves (31).

6 Claims, 2 Drawing Sheets

FOREIGN PATENT DOCUMENTS

| | | |
|---|---|---|
| DE | 34 48 086 C2 | 8/1985 |
| WO | WO 9419132 A1 * | 9/1994 |
| WO | WO 01/87523 A1 | 11/2001 |
| WO | WO 02/05990 A1 | 1/2002 |

* cited by examiner

MACHINING TOOL, ESPECIALLY A MILLING TOOL

FIELD OF THE INVENTION

The present invention relates to a machining tool, especially a milling tool, having a shaft-like holder defining a longitudinal axis. On its frontal surface, a seat is provided for a cutting plate which may be mounted on the holder. This cutting plate has at least one cutting edge projecting radially from a central body having a bore coaxial with the longitudinal axis for a fastening screw securing the cutting plate axially on the seat of the holder, and has a coupling component for mounting on the seat of the holder having three ribs projecting axially from the end face of the body facing the holder and extending radially. The ribs are provided for engagement in complementarily configured grooves on the seat of the holder. The side walls of the grooves form driving surfaces and support surfaces which operate in conjunction with coordinated surfaces of the flanks of the ribs for transfer of operating torque or for securing the axial position.

BACKGROUND OF THE INVENTION

DE 34 48 086 C2 discloses a machine tool having a cutting edge for inside machining of a rotating workpiece. The cutting force active on the cutting plate generates an operating torque relative to the shaft-like holder which is to be transferred between holder and cutting plate by driving surfaces. In the case of a rotating machine tool, such as a milling tool in which the shaft-like holder is connected to a drive spindle, the operating torque generating the cutting force is transferred from the shaft-like holder to the cutting plate by the driving surfaces.

Machine tools of this kind are often used for machining processes to be performed with high precision. Reliable and precisely defined positioning of the cutting plate on the seat of the holder is of decisive importance in ensuring adherence to the narrow tolerances required and production of machined surfaces of high quality. In this respect, particular attention must be devoted in production to achievement of the greatest possible precision of the geometry of the areas of the cutting plate adjoining the driving surfaces and support surfaces. The properties of the material of the cutting plates this results in high production costs, since the sintered blanks forming the hard metal cutting plates are difficult to machine.

WO 01/87523 A1 discloses a machine tool having a polygonal shaped recess in the holder. The polygonal groove-shaped recesses have convexly curved path surfaces. A correspondingly projecting polygon on the cutting plate is provided for engagement in the polygonal recess in the holder. Accordingly the cutting plate may be fastened on the holder by way of a conventional screw connection. For the machine tool, the driving surfaces and the support surfaces of the correspondingly configured polygonal combinations are formed by limited component surfaces of the side walls. The remaining surfaces are retracted from these component surfaces for the purpose of forming a space between the ribs and the walls of the grooves (see FIG. 9 of WO 01/87523 A1).

SUMMARY OF THE INVENTION

An object of the present invention is to provide an improved coupling between the holder and the cutting plate.

According to the present invention, this object is attained for a machine tool where the driving surfaces and the support surfaces are made up of limited component surfaces of the side walls of the grooves. The other surfaces of the grooves are retracted from these component surfaces to form a space between the ribs and the walls of the grooves. All component surfaces are in the form of wall components projecting in the form of ribs which are in alignment opposite each other and which are provided on both side walls of the grooves of the seat of the holder.

For the present invention, only component surfaces on the side walls in the grooves of the seat of the holder form the bearing areas on which the cutting plate is positioned on the seat and secured by a fastening screw. As a result, production is simplified, since, in contrast to the contact over the entire area between the ribs of the cutting plate and the grooves of the seat of the holder, correspondingly narrow tolerances need be specified only for bearing surface areas. In other words, the accuracy of positioning of the cutting plate on the seat is not disturbed by any surface errors which may occur outside the limited bearing areas should such errors occur on the retracted surfaces present outside the bearing areas. The dimensions determined for the component surfaces of the grooves of the seat forming driving surfaces and the support surfaces are such that contact on the flanks of the ribs of the cutting plate occurs more or less only as linear contact, preferably on the radially exterior areas of the ribs, and accordingly at a correspondingly great radial distance from the longitudinal axis of the tool. Appropriate axial spacing is then created for transfer of the operating torque generated by the action of the cutting force. As an alternative or in addition, the configuration may be such that the path of the side walls of the grooves diverges slightly from the outer end to the inner end adjacent to the longitudinal axis. The clearance between the side walls in the radially inner area is then larger than in the outer area of the grooves and is larger than the corresponding width of the ribs of the cutting plate. In such configuration, the outer end areas of the grooves, which are positioned at a smaller distance from each other, always form the component surfaces serving as bearing areas in relation to which the areas of the walls positioned farther inward radially are positioned farther away because of the slightly divergent path of the side flanks of the ribs of the cutting plate.

In a preferred embodiment, wall components projecting as ribs are provided on the outer end area of the grooves as bearing component surfaces, along with a path of the side walls in the grooves diverging slightly radially inward from the bearing area.

Preferably, the geometry and the dimensioning selected for the flanks of the ribs of the cutting plate and of the component surfaces of the grooves of the seat of the holder forming the bearing areas are such that, when the cutting plate is in contact with the seat of the holder, an intervening space is provided between the end surface of the cutting plate and the facing frontal surface of the seat of the holder. Any surface defects present on the areas of the cutting plate situated outside the bearing areas of the cutting plate and the seat of the holder are insignificant.

To reduce the danger that fouling of the intervening space might be caused by penetration of machining residue during operation, an edge area projecting slightly from the frontal surface of the circumference of the seat of the holder may form a circumferential local reduction of the intervening space between end surface of the cutting plate and facing frontal surface of the seat of the holder.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
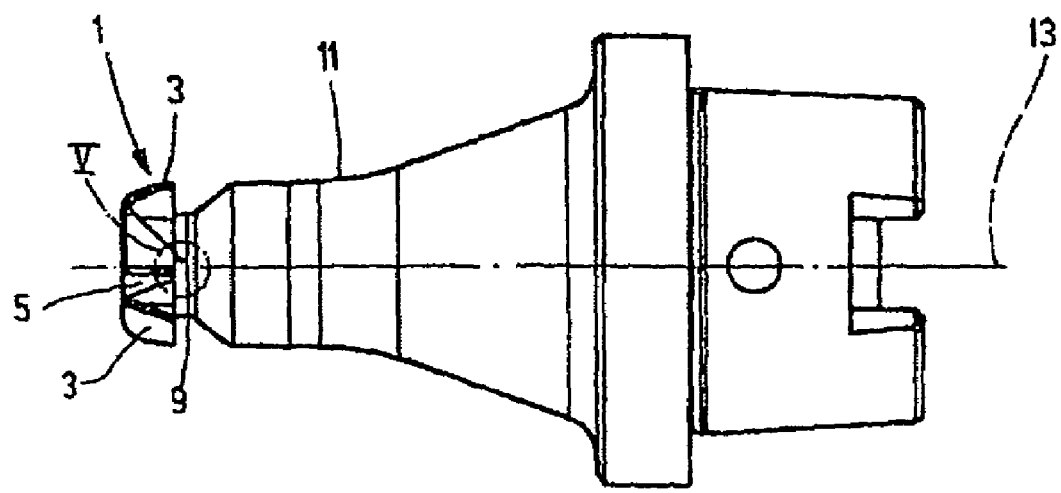
FIG. 1 is a side elevational view of a machine tool in the form of a milling tool, according to an embodiment of the present invention.

The present invention is explained with reference to an exemplary embodiment of a machine tool in the form of a milling tool having a cutting plate 1. Cutting plate 1 has four cutting edges 3 projecting radially from a central body 5 circular in outline. The body 5 has a central bore 7 for a fastening screw (not shown). The cutting plate 1 may be secured by the fastening screw on a seat 9 configured on the frontal end of a holder 11 in the form of a milling shaft having a longitudinal axis 13. The seat 9 has a threaded bore 15 coaxial with the longitudinal axis 13 for the fastening screw (not shown) for securing the cutting plate 1. This fastening screw has a cone-shaped section which, in conjunction with a tapered surface 17 situated in the vicinity of the exterior end area of the bore 7 and extending this bore 7 outward, contributes to centering of the cutting plate 1 on the seat 9 of the holder 11.

Rather than being in the form of a rotating milling tool, the embodiment of the present invention might also assume the form of a non-rotating machine tool used, for example, for inside machining of a rotating workpiece. Such tool may have a cutting plate, for example, with only one cutting edge. In both instances, operating torque acting around the longitudinal axis 13 by interaction of seat 9 of the holder 11 and cutting plate 1 is to be transferred.

Figure 3:
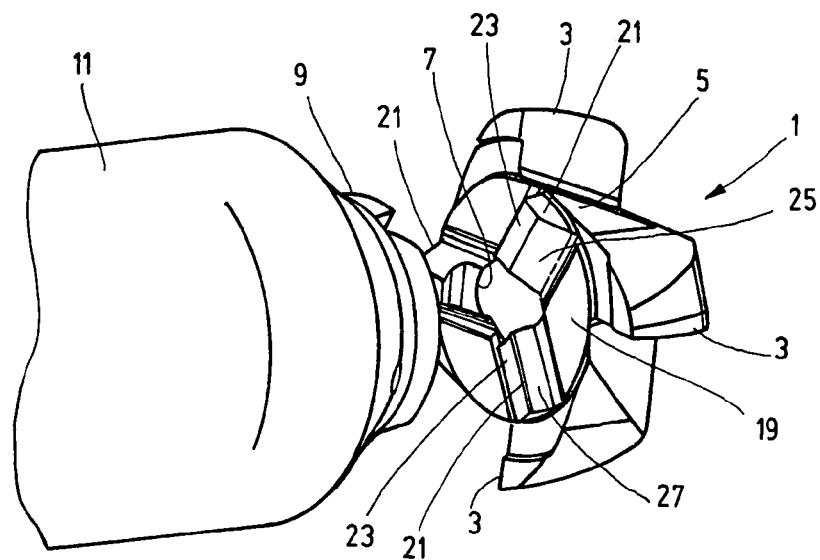
FIG. 3 is a rear perspective view of the tool of FIG. 1, similar to that of FIG. 2, in the line of sight to the end surface of the cutting plate facing the seat of the holder.

For axial positioning and transfer of torque, the cutting plate 1 has on its end surface 19 facing the holder 11 (FIG. 3) a coupling component with three axially projecting ribs 21. The ribs enclose the same central angles relative to each other, and extend in radial directions from the central bore 7 to the circumference of the end surface 19 on the body 5 of the cutting plate 1. As shown particularly in FIG. 3, the ribs 21 have tapering side flanks 25 and 27 (see FIGS. 3 and 5). The angles of inclination of these flanks 25 and 27 vary, the inclination of the flank 27 being steeper than that of the flank 25.

Figure 2:
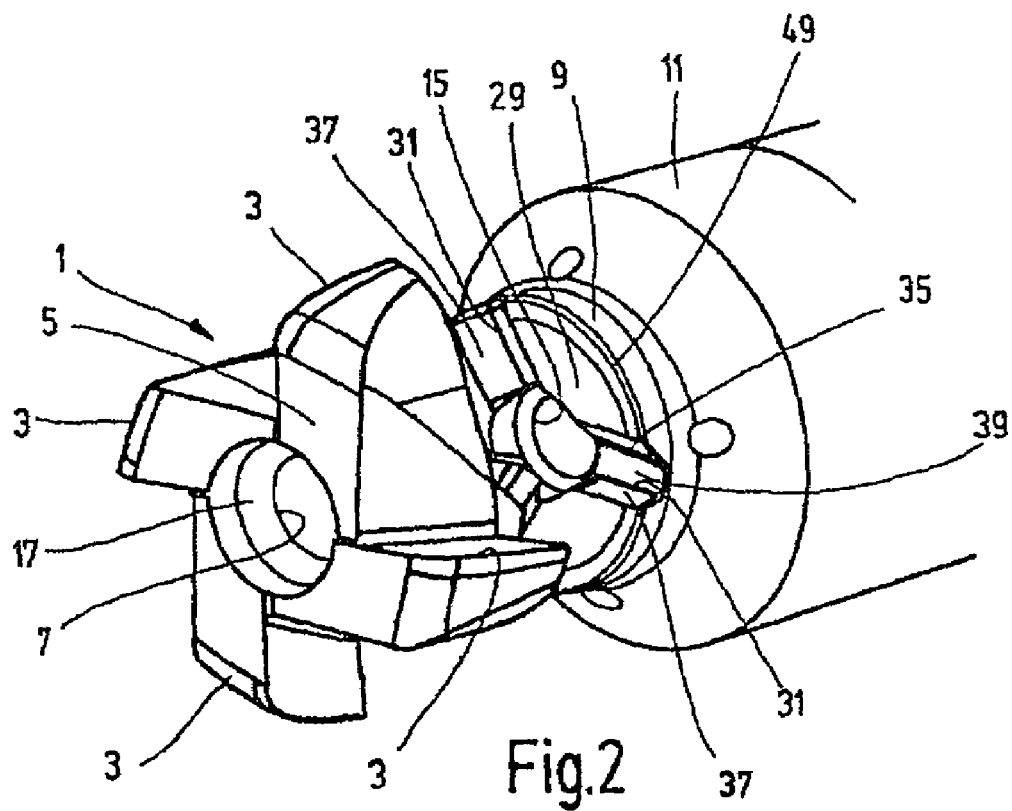
FIG. 2 is a front perspective view of the tool of FIG. 1 with the cutting plate raised from the seat of the holder, the central fastening screw securing the cutting plate axially on the seat being omitted.

The seat 9 of the holder 11 is formed on its frontal or front surface 29 situated in a normal radial plane perpendicular to the axis 13, and has three grooves 31 complementary to the ribs 21 in the frontal surface 29. The side walls of these grooves are designated as 35 and 37. The inclination of the side walls 35 and 37 corresponds to the inclination of the flanks 25 and 27, respectively, of the ribs 21 of the cutting plate 1. The plane groove base of the grooves 31 is designated as 39, see FIGS. 2 and 5.

Figure 4:
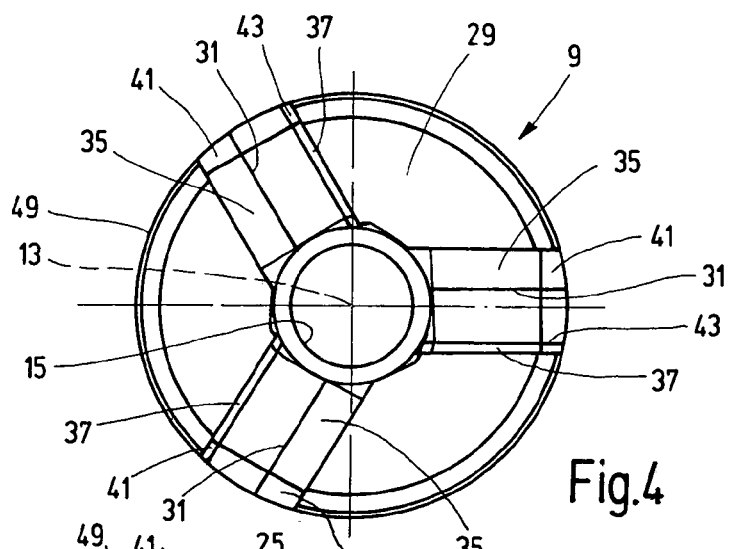
FIG. 4 is a top plan view, enlarged in comparison to FIGS. 2 and 3, of the seat of the holder of the tool of FIG. 1.

As shown in FIG. 4, the grooves 31 are very slightly wider at their interior end area than at their exterior end extending radially relative to the axis 13. In the area of this exterior end, on each side wall 35 and 37, a wall component 41 and 43 projects slightly in the form of a rib. These wall components 41 and 43 are aligned with each other, and form an additional slight local narrowing of the grooves 31. These component surfaces, made up of wall components 41 and 43 from which the other surfaces of the side walls 35 and 37 are retracted, represent the only support surfaces of the seat 9 in contact with the ribs 21 of the cutting plate 1. As shown particularly in FIG. 5, which illustrates the radially exterior end of a groove 31 and the corresponding outer end of a rib 21 introduced into this groove, the side flank 27 of the rib 21 is in contact with the projecting wall component 43 and the flank 25 of the rib 21 is in contact with the projecting wall component 42 of the groove 31. There is a space between the groove base 39 and the top surface 23 of the rib 21.

The side flank 27 is represented by the more steeply inclined flank of the rib 21. The surface of the wall component 43 adjoining the flank 27 forms a driving surface for transfer of the operating torque caused by the cutting force (see arrow 45). The opposite projecting wall component 41 of the groove 31 forms the component surface belonging to the bearing area and serving as additional support surface.

The remaining side wall components of the grooves 31 are retracted even farther from the flanks 25 and 27 of the ribs 21 by the inwardly radial divergent path of the side walls 35 and 37 of the grooves 31.

Figure 5:
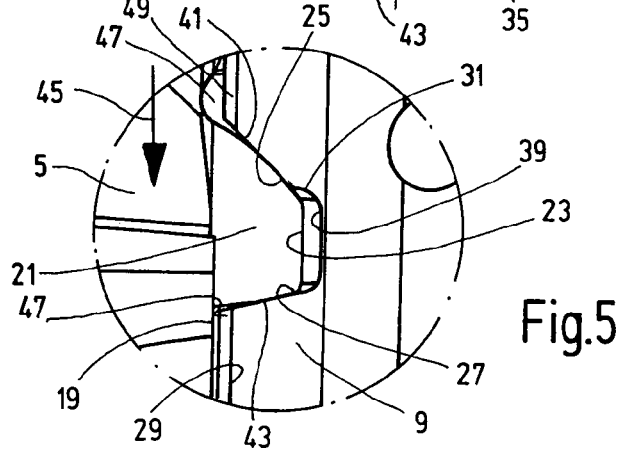
FIG. 5 is a greatly enlarged side elevational view of the section designated as V in FIG. 1.

As shown the most clearly in FIG. 5, between the end surface 19 on the body 5 and the frontal surface 29 on the seat 9, an intervening space 47 is present when the side flanks 25 and 27 are in contact with the bearing area of the grooves 31. An edge 49 projects slightly in the axial direction, encloses the frontal surface 29 of the seat on the circumference, and effects local reduction of the intervening space as protection from penetration by fouling matter.

The bearing component surfaces of the grooves 31, formed by the projecting wall components 41 and 43 by which the wall components 43 form driving surfaces and the wall components 41 form support surfaces for the ribs 21, could be replaced by different configurations of the side walls 35 and 37 of the grooves 31 which form limited component surfaces functioning exclusively as bearing areas. Hence, the formation of limited component surfaces defining the bearing areas of the component surface could be effected exclusively by the divergent configuration of the side walls of the grooves, that is, without projecting wall components 41 and 43.

While an embodiment has been chosen to illustrate the invention, it will be understood by those skilled in the art that various changes and modifications can be made therein without departing from the scope of the invention as defined in the appended claims.

What is claimed is:

1. A machining tool, comprising: a cutting plate having a cutting edge projecting radially from a central body thereof; a shaft-like holder having a longitudinal axis and a seat on a frontal surface of said holder receiving said cutting plate, said seat having grooves with side walls forming driving surfaces and support surfaces; a bore in said central body coaxial with said longitudinal axis to receive a fastening screw for securing said cutting plate axially on said seat of said holder; a coupling component on said central body for mounting said central body on said seat, said coupling component having three ribs projecting from an end surface of said central body and extending radially, said ribs having flanks with coordinated surfaces and being complementarily shaped to said grooves for transfer of operating torque and securing axial positioning; and limited component surfaces formed on said driving surfaces and said support surfaces of said side walls of said grooves, remaining portions of said driving surfaces and said support surfaces being retracted from said component surfaces providing a space between said ribs and said remaining portions of said driving surfaces and said support surfaces, said component surfaces being projecting wall components aligned opposite one another on both of said side walls of said grooves.

2. A machining tool according to claim 1 wherein
said component surfaces engage said ribs on radially exterior end areas of said ribs at radial distances from said longitudinal axis.

3. A machining tool according to claim 1 wherein
said side walls of said grooves diverge slightly from exterior ends thereof to interior ends thereof adjacent said longitudinal axis, clearances between said side walls in each of said grooves in radially interior areas of said grooves being greater than clearances in exterior areas of said grooves and being greater than corresponding widths of said ribs of said cutting plate.

4. A machining tool according to claim 1 wherein
an intervening space extends between said end surface of said cutting plate and said frontal surface when said flanks of said ribs contact respective ones of said component surfaces of said grooves.

5. A machining tool according to claim 4 wherein
an edge on a circumference of said seat projects a short distance axially from said frontal surface, said edge forming a circumferential local reduction of said intervening space between said end surface of said cutting plate and said frontal surface of said holder.

6. A machining tool according to claim 1 wherein
said flanks of said ribs and said side walls of said grooves follow a path inclined at an angle varying in amount relative to a plane perpendicular to said longitudinal axis; and
said side walls of said grooves having angles of pitch steeper on sides thereof forming said driving surfaces for transfer of operating torque than on sides thereof forming said support surfaces.

* * * * *